(12) United States Patent
Kousalik et al.

(10) Patent No.: US 11,814,755 B2
(45) Date of Patent: Nov. 14, 2023

(54) METHOD OF CONTACTLESS OPTICAL DETECTION OF YARN AT A WORKSTATION OF A YARN MANUFACTURING TEXTILE MACHINE, AN OPTICAL SENSOR OF YARN AND A TEXTILE MACHINE

(71) Applicant: Rieter CZ s.r.o., Usti nad Orlici (CZ)

(72) Inventors: Pavel Kousalik, Usti nad Orlici (CZ); Zdenek Beran, Lanskroun (CZ)

(73) Assignee: Rieter CZ s.r.o., Usti nad Orlici (CZ)

( * ) Notice: Subject to any disclaimer, the term of this patent is extended or adjusted under 35 U.S.C. 154(b) by 108 days.

(21) Appl. No.: 17/599,102

(22) PCT Filed: Mar. 27, 2020

(86) PCT No.: PCT/CZ2020/050015
§ 371 (c)(1),
(2) Date: Sep. 28, 2021

(87) PCT Pub. No.: WO2020/200334
PCT Pub. Date: Oct. 8, 2020

(65) Prior Publication Data
US 2022/0162778 A1 May 26, 2022

(30) Foreign Application Priority Data
Mar. 29, 2019 (CZ) .................................. CZ2019-196

(51) Int. Cl.
*D01H 13/16* (2006.01)
*B65H 63/032* (2006.01)
(Continued)

(52) U.S. Cl.
CPC ....... *D01H 13/165* (2013.01); *B65H 63/0324* (2013.01); *D01H 13/18* (2013.01);
(Continued)

(58) Field of Classification Search
CPC ...... D01H 13/165; D01H 13/22; D01H 13/20; B65H 63/0324; B65H 63/06; G01B 11/002; G01N 21/8915
See application file for complete search history.

(56) References Cited

U.S. PATENT DOCUMENTS 6,219,135 B1 * 4/2001 Hensel ............... G01B 11/2433
356/238.2
6,242,755 B1 * 6/2001 Henze .................. G01B 11/105
250/221
(Continued)

FOREIGN PATENT DOCUMENTS

CZ          299684 B6    8/2003
CZ          304683 B6    8/2014
(Continued)

OTHER PUBLICATIONS

CZ Search Report, dated Sep. 23, 2019.
PCT Search Report, dated Aug. 19, 2020.

*Primary Examiner* — Patrick J. Lynch
(74) *Attorney, Agent, or Firm* — Dority & Manning, P.A.

(57) ABSTRACT

A method is provided for contactless optical detection of yarn at a workstation of a textile machine. The yarn moves in a sensing slot between a radiation source and an optical sensor having at least one row of radiation sensitive elements. Shading of the individual radiation sensitive elements by yarn moving through the slot is monitored and a state of the yarn is evaluated based on the monitoring, which includes monitoring and evaluating a position of the yarn in the sensing slot or a time course of the position of the yarn in the sensing slot. A change is detected in the position or in the time course corresponding to a yarn break before an end of the yarn break passes through the sensing slot. When the yarn break is sensed, a stop signal is generated for the workstation.

11 Claims, 6 Drawing Sheets

(51) Int. Cl.
*D01H 13/18* (2006.01)
*D01H 13/20* (2006.01)
*D01H 13/22* (2006.01)

(52) U.S. Cl.
CPC ............. *D01H 13/20* (2013.01); *D01H 13/22* (2013.01); *B65H 2701/31* (2013.01)

(56) References Cited

U.S. PATENT DOCUMENTS

| | | | | |
|---|---|---|---|---|
| 6,659,386 B1 * | 12/2003 | Rienas | ................ | D01H 13/165 242/478.2 |
| 9,575,048 B2 * | 2/2017 | Kousalik | ................ | G01N 21/15 |
| 2001/0034925 A1 * | 11/2001 | Hosel | ................... | D01H 13/165 19/236 |
| 2019/0195854 A1 * | 6/2019 | Perner | ................... | G06T 7/0004 |
| 2022/0282416 A1 * | 9/2022 | McComas | .......... | B65H 63/0324 |

FOREIGN PATENT DOCUMENTS

| | | | | |
|---|---|---|---|---|
| CZ | 306117 B6 | 10/2016 | | |
| CZ | 306820 B6 | 5/2017 | | |
| CZ | 307261 B6 | 5/2018 | | |
| DE | 195 44 632 A1 | 6/1997 | | |
| DE | 10163849 A1 * | 7/2002 | ........... | B65H 63/065 |
| EP | 0 971 204 A2 | 1/2000 | | |
| EP | 2 827 127 A2 | 1/2015 | | |
| WO | WO-2018193343 A1 * | 10/2018 | ........... | B65H 61/005 |

\* cited by examiner

METHOD OF CONTACTLESS OPTICAL DETECTION OF YARN AT A WORKSTATION OF A YARN MANUFACTURING TEXTILE MACHINE, AN OPTICAL SENSOR OF YARN AND A TEXTILE MACHINE

TECHNICAL FIELD

The invention relates to a method of contactless optical detection of yarn at a workstation of a yarn manufacturing textile machine in which yarn moves in a sensing slot between at least one source of radiation and at least one optical sensor means of the radiation comprising at least one row of radiation sensitive elements arranged next to each other, whereby shading of the individual radiation sensitive elements by the moving yarn is monitored and the state of the yarn is evaluated on the basis of this monitoring.

The invention also relates to an optical sensor of yarn at a workstation of a yarn manufacturing textile machine comprising at least one source of radiation and at least one optical sensor means arranged at a distance opposite the radiation source behind a sensing slot, the sensor means having at least one row of radiation sensitive elements arranged next to each other, whereby the optical sensor of yarn is provided with a monitoring and evaluation device of the state of the yarn in the sensing slot of the sensor, including the monitoring and evaluating of the position and diameter of the yarn, and this monitoring and evaluation device is connectable to a device for stopping the workstation upon detecting a yarn break.

In addition, the invention relates to a yarn manufacturing textile machine comprising at least one row of workstations, each of which comprises a fiber feeding device to a spinning unit, downstream of which is arranged a yarn draw-off mechanism and a yarn winding device onto a bobbin, whereby at each workstation is arranged at least one optical yarn sensor connected to a control system of the machine and provided with a monitoring and evaluation device of the state of yarn in a sensing slot of the sensor, including the monitoring and evaluation of the position and diameter of the yarn, and this monitoring and evaluation device of the yarn state is connected to means for stopping the workstation upon detecting a yarn break.

BACKGROUND

Yarn breaks occur on textile machines for yarn production, which not only reduce the quality of the overall yarn produced, but above all reduce the overall productivity of the machine, since it is then necessary to remove the break and resume yarn production. In order to resume production as quickly as possible, i.e., in the shortest possible time between detecting the break and resuming yarn production, it is important not to wind the broken end of the yarn onto the bobbin, to avoid the process of searching for and detecting the yarn end on the bobbin, which extends the time required to resume yarn production and reduces the success rate of resuming yarn production. In order to avoid winding the broken yarn end onto the bobbin, the stopping speed of the workstation is essential, i.e. stopping the yarn draw-off mechanism and the yarn winding mechanism at the workstation in the shortest time so that the broken end of the yarn is easy to be found in the yarn working path at the workstation. For this purpose, various ways of stopping the workstation after detecting the yarn break are applied nowadays so that the yarn end stops in the yarn working path even before it is wound onto the bobbin. Therefore, in order to successfully achieve this goal, it is desirable that the yarn break information be available to the workstation control device as soon as possible, ideally at a time when the yarn break is about to occur, but the actual break has not yet occurred.

From a number of documents, known are yarn break indication methods which utilize capacitive or tactile or optical yarn presence sensors of the presence of yarn in the area between yarn exit from the spinning unit (withdrawal tube) and the yarn draw-off mechanism or between the yarn draw-off mechanism and the yarn winding device. The disadvantage of these solutions is that the yarn break detection, which occurs only when the broken yarn end passes through the sensing area of the sensor, has a relatively large delay to the instant of actual break occurrence and this delay corresponds to the distance of the yarn break sensor from the point of the yarn break occurrence, e.g. in the spinning nozzle or in the collecting groove of the spinning rotor. This delay enables to delay the moment of starting the required operating sequence to stop the workstation so that for the successful stopping of the broken yarn end before it is wound on the spool, very intensive braking of the working elements of workstations as well as of the bobbin in the winding device is required, whereby the bobbin may have great weight and therefore great inertia.

It is known to place an additional yarn break sensor as close as possible to the collection groove of the spinning rotor or as close to the spinning nozzle as possible for early detection of the break and early start of the workstation stop, but this is often not possible for spatial and operational reasons. Moreover, due to the high speeds of the yarn movement on modern machines, it appears that such a trajectory difference in yarn break sensing does not produce sufficient results.

Another possibility of early detection of a yarn break is the use of a special sensor to monitor the tension in the yarn, which, however, brings further disadvantages in the form of workstation installation, control of the operation of the workstation, of the service robot at the workstation, etc.

DE 195 44 632 A1 discloses a method of contactless optical detection of yarn at a workstation of a yarn manufacturing textile machine in which yarn moves in a sensing slot between at least one source of radiation and at least one optical sensor means of radiation comprising at least one row of radiation sensitive elements arranged next to each other, whereby shading of the individual radiation sensitive elements by the moving yarn is monitored and the state of yarn is evaluated on the basis of this monitoring process. Yarn break is detected when the broken yarn end passes through the sensing slot. The yarn break cannot be detected earlier without installing an additional sensor to a workstation.

SUMMARY OF THE INVENTION

A goal of the invention is to eliminate or at least minimize the disadvantages of the background art, especially to allow early detection of a yarn break without installing an additional sensor to a workstation. Additional objects and advantages of the invention will be set forth in part in the following description, or may be obvious from the description, or may be learned through practice of the invention.

The objects of the invention is achieved by a method of contactless optical detection of a yarn break at a workstation of a yarn manufacturing textile machine, whose principle consists in that the position of the yarn and/or the time course of the position of the yarn both in a sensing slot is monitored and evaluated, whereby a change in the yarn position and/or the time course of the change in the yarn position corresponding to a yarn break is detected, and upon detecting the yarn break even before the passing of the broken yarn end through the sensing slot a signal to stop the workstation is issued.

In order to set the tolerance limits of the yarn break evaluation according to the invention, it is advantageous if a detected change in the yarn position and/or in the time course of the change in the yarn position in the sensing slot is compared to the preset limit value of the change in the yarn position and/or the preset limit time course of the change in the yarn position in the sensing slot, whereby exceeding these preset limit values is indicated as a yarn break and a signal to stop the workstation is issued.

To reduce incorrect yarn break detection, in addition to the monitoring and evaluating of the change in the yarn position and/or the time course of the change in the yarn position in the sensing slot, the yarn diameter is monitored and evaluated in the sensing slot and by mutual processing of the monitoring and evaluating of the yarn position change and the yarn diameter the effects of the yarn diameter changes on the yarn break detection are eliminated.

In order to improve the operation of the workstation, the data from the optical monitoring of the yarn is continuously stored and after the detection of the yarn break, the time course of the change in the yarn position and the time course of the change in the yarn diameter both before the yarn break and during the yarn break is retroactively evaluated, whereupon the results of this evaluation are compared to the preset time courses and the type of yarn break is determined.

So as to improve the control of the operations following the yarn break detection, it is advantageous if according to the determined type of yarn break, specific commands to stop the respective spinning station and/or for the subsequent behaviour of the service robot and/or for the subsequent behaviour of the human operator of the machine are set.

The principle of the optical sensor for contactless optical detection of a yarn break of yarn at the workstation of a yarn manufacturing textile machine consists in that the yarn monitoring and evaluating device is provided with a detector of changes in the yarn position and/or of changes in the time course of the yarn position corresponding to the yarn break before the passing of the broken yarn end through the sensing slot.

For the setting of tolerance limits of the yarn break evaluation according to the invention, it is advantageous if the yarn monitoring and evaluation device is coupled to a memory means with a stored preset limit value of the change in the yarn position and/or preset limit time course of the change in the yarn position in the sensing slot, whereby the yarn monitoring and evaluation device is further provided with a comparative means adapted to detect any exceeding of the preset limit values of changes in the yarn position by the actual monitored and evaluated values of changes in the yarn position.

To improve yarn break detection and reduce detection errors, it is advantageous if the monitoring and evaluation device of yarn is provided with a device for the mutual processing of the results of the monitoring and evaluation of the yarn position and of the yarn diameter.

In terms of performance and capacity utilization, it is advantageous if the optical sensor of yarn is an optical sensor of the yarn quality.

The principle of the yarn manufacturing textile machine consists in the fact that the yarn monitoring and evaluation device of the optical sensor of yarn at each workstation is provided with a detector of changes in the yarn position and/or in the time course of the changes in the yarn position corresponding to the yarn break before the passing of the broken yarn end through the sensing slot.

From the point of view of utilizing the workstation means, it is advantageous if the optical sensor of yarn is formed by an optical sensor of the yarn quality which is situated at the workstation between the outlet of the yarn from a spinning unit and a yarn draw-off mechanism.

In particular, the overall advantage of the present invention is that it enables the stopping operations of the workstation to commence before the broken end of the yarn passes through the optical sensor. Moreover, when monitoring the yarn position and yarn diameter before and during the break, it is possible to distinguish between a technological break and a break caused, for example, by a sliver impurity or a break caused by a sliver break or sliver end, and adjust the follow-up steps at the workstation accordingly.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The invention will be described with reference to an exemplary embodiment on a textile machine comprising a row of workstations arranged next to each other for producing yarn 1 and winding yarn 1 on a bobbin. An example of such a textile machine is a rotor spinning machine producing yarn, wherein the invention is equally applicable at the workstation of an air-jet spinning machine, or it can be used on rewinding and winding textile machines operating with moving yarn, etc.

Figure 1:
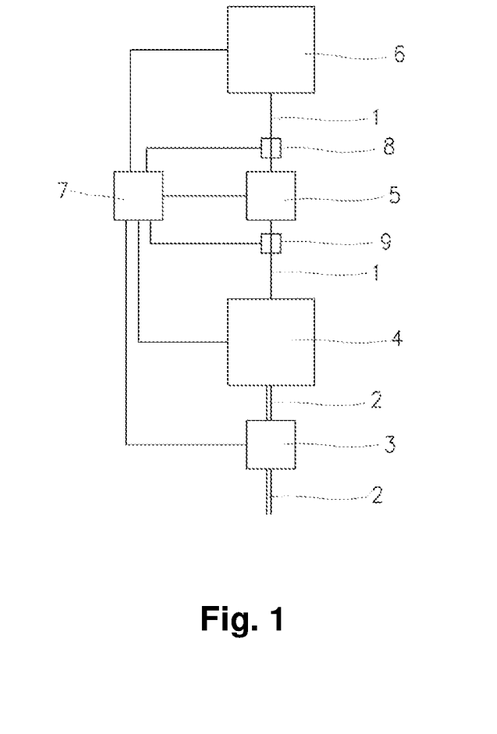
FIG. 1 shows an exemplary arrangement of a workstation and its elements.

In the direction of the fiber movement through the process of yarn formation, each workstation comprises firstly a device 3 for feeding fibers 2 to a spinning unit 4.

Fibers 2 are fed to the process of yarn 1 production in a suitable form, e.g. in the form of a roving or a sliver etc.

The devices 3 for feeding fibers 2 to the spinning unit 4 are arranged upstream of the spinning unit 4 and are made as either separate device, e.g., a drafting device of the air-jet spinning machine, or they are made as part of the spinning unit 4, such as the feeding device of the spinning unit of the rotor spinning machine, etc.

The spinning unit 4, for example, comprises an unillustrated spinning rotor or a spinning nozzle in which yarn 1 is formed from the supplied fibers.

A draw-off mechanism 5 of yarn 1, e.g. known draw-off rollers (not shown), is arranged downstream of the spinning unit 4. Arranged downstream of the draw-off mechanism 5 of yarn 1 is a yarn 1 winding device 6 onto a bobbin (not shown), including an unillustrated traversing device of yarn over the width of the bobbin during the winding of the yarn 1 onto the bobbin.

The spinning unit 4, the individual devices 3, 5, 6 and other work nodes of the workstation or individual or at least some working elements thereof are connected to a control system, namely either to the control system of the respective unit and/or the control system of the respective workstation and/or the control system of the respective section of the machine and/or the control system of the entire machine, etc., generally speaking, they are connected to the control system 7. The specific arrangement and hierarchy of the individual parts of the control system 7 is highly variable and as such is not the subject of this solution.

At least one yarn quality sensor 9 is arranged between the spinning unit 4 and the winding device 6. The yarn quality sensor 9 is part of a system for monitoring the quality of the produced yarn 1, which measures the characteristics and evaluates the quality of yarn 1 and after detecting a defect in the yarn 1 makes a decision about the removal of the defect and, if necessary, ensures that the defect is removed. In the embodiment shown, the sensor 9 of the yarn quality is arranged between the spinning unit 4 and the draw-off mechanism 5 of yarn 1. In addition, in the embodiment shown, a sensor 8 of the presence of yarn is arranged between the draw-off mechanism 5 of yarn 1 and the winding device 6 of yarn 1. In an exemplary embodiment (not shown), the yarn quality sensor 9 is arranged between the draw-off mechanism 5 of yarn 1 and the winding device 6 of yarn 1. In another exemplary embodiment (not shown), only one sensor of yarn 1 is arranged at the workstation, namely a yarn quality sensor 9. In another embodiment (not shown), at least a pair of sensors 9 of the yarn 1 quality is arranged at the workstation. Both the yarn quality sensor 9 and the sensor 8 of the presence of yarn 1 are connected to the control system 7.

Figure 2:
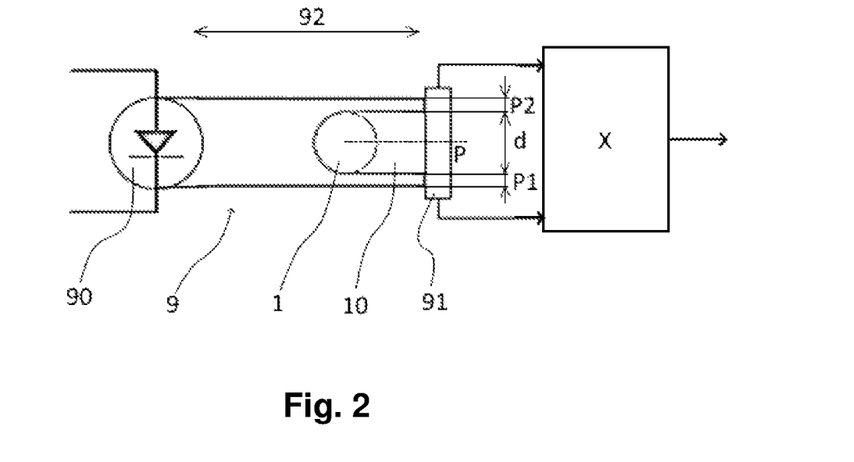
FIG. 2 shows the principle of measuring yarn by an optical sensor of yarn.

As shown in FIG. 2, the sensor 9 of the yarn quality comprises a source 90 of radiation and a sensor means 91 of radiation disposed against it, whereby the latter comprises at least one row of sensing elements sensitive to the radiation emitted by the source 90 of radiation which are arranged next to each other. For example, the sensor means 91 is formed by least a single-line CCD or CMOS optical sensor. The sensor means 91 of radiation is connected to the control and evaluation electronics X.

Between the source 90 of radiation and the sensor means 91 of radiation there is a sensing slot 92, through which the yarn 1 passes during measurement. Obviously, the sensor means 91 is arranged in the direction of the diameter of the yarn 1 whose shadow 10 is projected on the sensor means 91. As a result, part of the individual sensing elements of the sensor means 91 is completely shaded by this shadow 10, part is shaded only partially and part is not shaded at all, as can be seen, e.g., in FIGS. 3a to 3c.

Figure 2A:
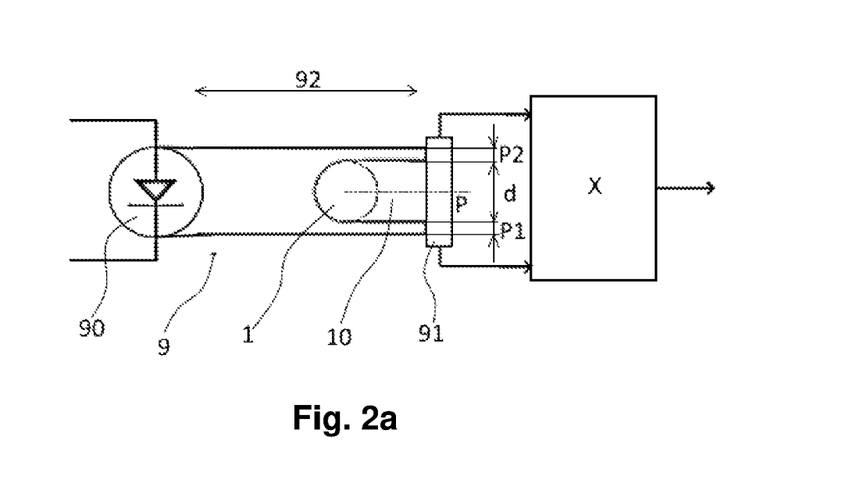
FIG. 2a shows the position of the yarn relative to the yarn sensor elements at time point $t_1$.
Figure 2B:
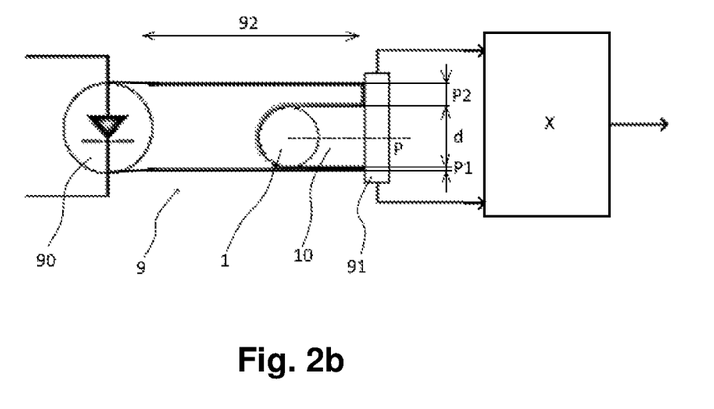
FIG. 2b shows the position of the yarn relative to the yarn sensor elements at time point $t_2$.
Figure 2C:
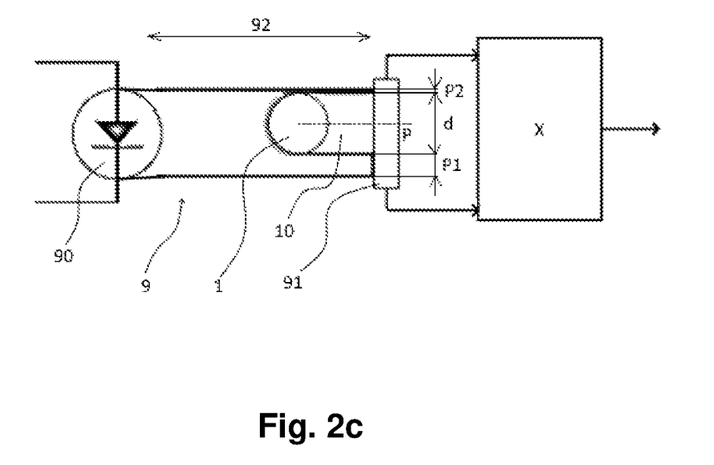
FIG. 2c shows the position of the yarn relative to the yarn sensor elements at time point $t_3$.
Figure 3A:
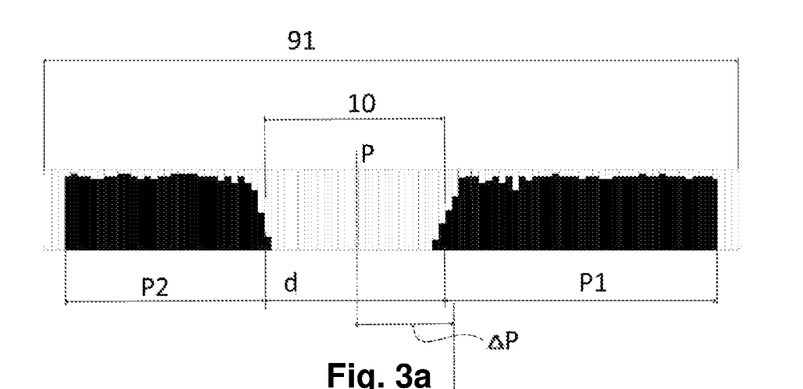
FIG. 3a represents the instantaneous size and position of the yarn shadow over the width of an exemplary one-line optical sensor of yarn at time point $t_1$.
Figure 3B:
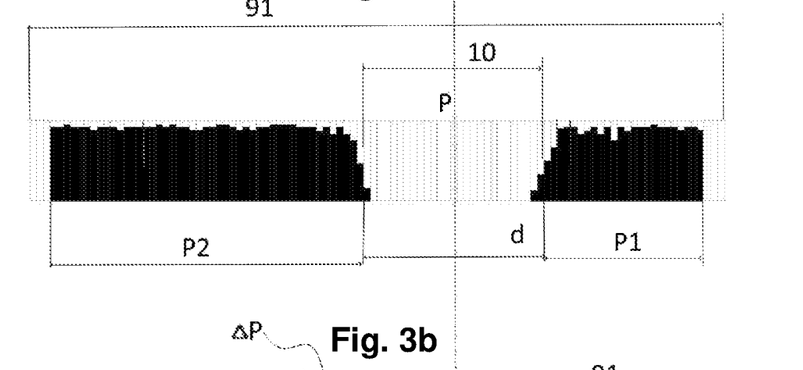
FIG. 3b represents the instantaneous size and position of the yarn shadow over the width of an exemplary one-line optical sensor of the yarn at time point $t_2$.
Figure 3C:
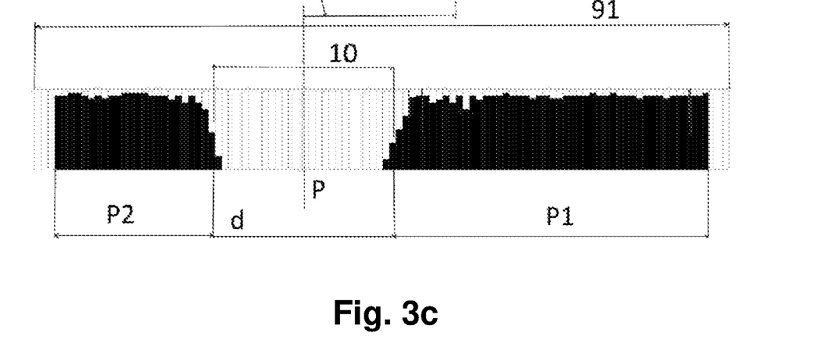
FIG. 3c represents the instantaneous size and position of the yarn shadow over the width of an exemplary one-line optical sensor of yarn at time point $t_3$.

In principle, from the number of the shaded sensing elements, i.e. from the size of the shaded width of the sensor means 91, the diameter d of the yarn 1 is determined, and from the number of unshaded sensing elements on both sides of the shaded portion of the sensor means 91, that is, from the size of the unshaded width $P_1$, $P_2$ of the sensor means 91 on each side of the shaded area of the sensor means 91, the position P of the yarn 1 relative to the sensor means 91 is determined, as can be seen in FIGS. 2 to 3c. For the sake of simplicity, in FIGS. 2 to 3c, the position P of the yarn 1 relative to the sensor means 91 is indicated by the position of the center of the yarn 1 relative to the sensor means 91.

During the spinning process, i.e. during the production of yarn 1, the yarn 1 moves from the spinning unit 4 to the winding device 6 of yarn 1 onto the bobbin, passing also through the sensing slot 92 of the sensor 9 of the yarn quality. During this passage of the yarn, 1 the yarn quality sensor 9, among others, monitors and evaluates the position P of the yarn 1 in the sensing slot 92, as well as a change $\Delta P$ of this position P. In addition, the sensor 9 of the yarn quality also monitors the diameter d of the yarn 1 in the sensing slot 92. During spinning, the yarn 1 moves naturally in the sensing slot 92, so that these changes $\Delta P$ in the position P of the yarn 1 appear as changes in the position of the shadow 10 projected (cast) by the yarn 1 on the sensor means 91, which are evaluated by means of the size of the unshaded width $P_1$, $P_2$ of the sensor means 91 on each side of the shaded area of the sensor means 91, or according to the changes in the size of the unshaded width $P_1$, $P_2$ of the sensor means 91 on each side of the shaded area of the sensor means 91. To a certain extent this also happens during stable spinning, whereby during stable spinning the movement of the yarn 1 in the sensing slot 92 is characteristic, which is due to the a more or less constant tension of the yarn 1 during the yarn 1 production.

If a yarn 1 break occurs, or a yarn 1 break is about occur (i.e., it is inevitable that the break is going to occur any moment), the yarn tension changes almost immediately. This change in the yarn tension affects the time course of the movement, or the position P of the yarn 1 in the sensing slot 92. As a result, the yarn 1 break or the approaching yarn 1 break is manifested by the movement of the yarn 1 in the sensing slot 92 even before the broken end of the yarn 1 itself passes through the sensing slot 92. The time course of the movement of the yarn 1 in the sensing slot 92, or, in other words, the time course of the position P, is in this case manifested on the sensor means 91 by a corresponding time course of the change $\Delta P$ in the position P of the yarn 1 relative to the sensor means 91, or, in other words, by a corresponding time course of the change in the position of the shadow 10 of the yarn 1 on the sensor means 91.

Therefore, so as to reduce the yarn 1 break detection time according to the present invention, the change $\Delta P$ in the position P of the yarn 1 in the sensing slot 92 is monitored and evaluated. The changing size of the unshaded width $P_1$, $P_2$ of the sensor means 91 on each side of the unshaded area of the sensor means 91 is seen in FIGS. 2a to 2c, which manifests itself as a change in the position of the shadow 10 of the yarn 1 on the sensor means 91. In FIGS. 3a to 3c, the time course of this change ΔP in the position P of the yarn 1 or its shadow 10 is monitored and evaluated. If this monitored and evaluated change ΔP in the position P of the yarn 1 in the sensing slot 92 or a change of the position of the shadow 10 of the yarn in the sensing slot 92 exceeds the preset values, this state is considered to be a yarn break 1 even before the end of the broken yarn 1 actually passes through the sensing slot 92. Such yarn break detection is then followed by further operations at the respective workstation of the machine, such as controlled stopping of the workstation, resumption of spinning, etc.

In practice, it appears that the position P of the yarn 1 in the sensing slot 92, i.e. the position of the shadow 10 of the yarn 1 on the sensor means 91, or the yarn position signal A (see FIG. 4b) which is obtained from the sensor 9 is also influenced by the yarn diameter d, e.g., by the irregularities of the diameter of the yarn 1 caused by the occurrence of local thicknesses or weaknesses of the yarn 1. This could result in false detection of yarn 1 breaks by monitoring and evaluating the movement (position P) of the yarn 1 in the sensing slot 92. Therefore, in a preferred embodiment, in order to improve the detection of a yarn 1 break by monitoring and evaluation of the changes ΔP in the position P of the yarn 1, or of its shadow 10, by the sensor 9 of the yarn quality according to the present invention, the influence of the current diameter of the yarn 1 on the position of the yarn 1 in the sensing slot 92, or the position of the shadow 10 of the yarn 1 on the sensor means 91 is eliminated by simultaneous monitoring and evaluation not only of the position P of the yarn 1, but also the diameter d of the yarn 1 in the sensing slot 92, by which the signal B is obtained, see FIG. 4a. By mutual processing the signal A of the changes ΔP in the position of the yarn 1 and the signal B of the diameter d of the yarn 1, in other words, the changes Δd in the yarn diameter d, a resulting signal C (see FIG. 4c) is generated to eliminate the effects of the changes Δd in the yarn 1 diameter d on the yarn 1 break detection according to the present invention, i.e. by moving the yarn 1 in the yarn quality sensor 9 even before the broken yarn 1 end passes through the sensor 9.

Figure 4A:
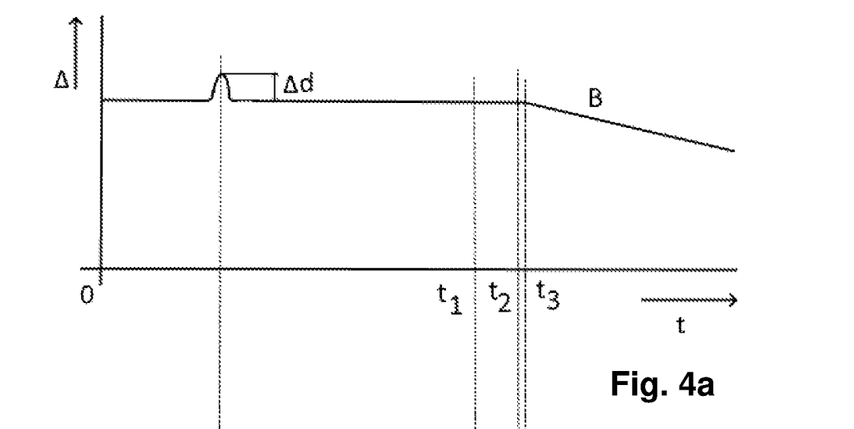
FIG. 4a is an example of an output signal of measuring the yarn diameter by the optical sensor of yam.
Figure 4B:
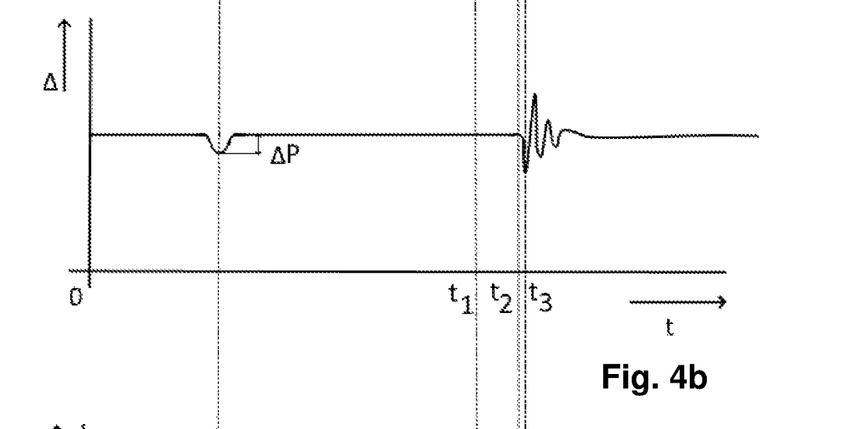
FIG. 4b is an example of a measured signal of the position of yarn shadow over the width of the optical sensor of yam.
Figure 4C:
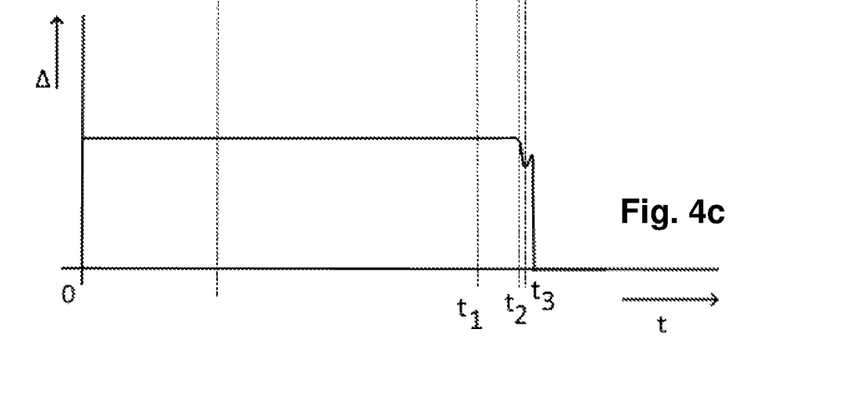
FIG. 4c shows early detection of yarn break during processing of output signals of the optical sensor of yam.
Figure 5:
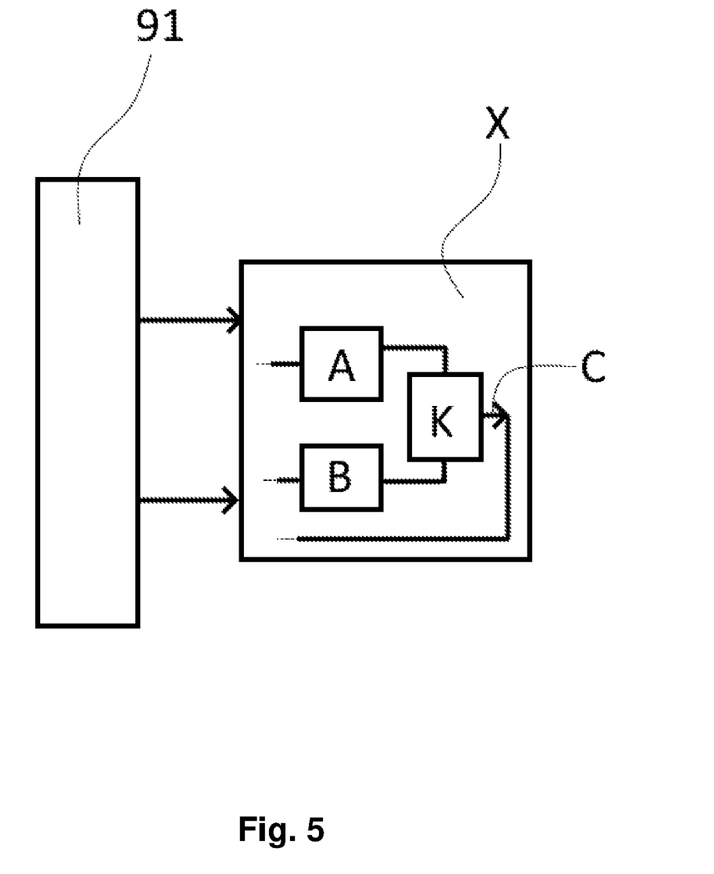
FIG. 5 is a schematic arrangement of a part of the circuit of the sensor for the break evaluation.

As shown in FIGS. 4a to 4c, the change Δd in the diameter d of the yarn 1 manifests itself also as a change ΔP in the position P of the yarn 1 on the signal A, in the same way as the change Δd in the diameter d of the yarn 1 on the signal B, and so by processing both the signals A and B by the device K in the control and evaluation electronics X, for example into the form of the signal C (see FIGS. 4c and 5) which has not been changed here, it is detected that there is no yarn break. Furthermore, as shown in FIGS. 4a to 4c, normal spinning continues, normal spinning continues, even at time point $t_1$. At time point $t_2$, a change in ΔP in the position P of the yarn 1 is detected from the signal A, whereby the signal B of the diameter d of the yarn 1 remains virtually unchanged and the resulting signal C also exhibits changes, which can already be considered as a yarn break 1 or an inevitably approaching break. At time point $t_3$, a change ΔP in the position P of the yarn 1 is further detected from the signal A and at the same time a change Δd in the diameter d of the yarn 1 is detected from signal B, which is caused, for example, by progressively decreasing yarn 1 diameter towards the broken yarn 1 end, which detects reliably a yarn 1 break before the yarn 1 broken end passes through the sensing slot 92 of the sensor 9 of the yarn quality.

In an exemplary embodiment (not shown), the yarn quality sensor 9 is replaced with another suitable optical sensor capable of detecting the position P and, optionally, also the diameter d of the yarn 1 in the sensing slot 92, e.g. with an optical sensor of the presence of yarn 1, etc.

In order to improve the operation of the workstation, the data from the optical monitoring of the yarn 1 according to the present invention are continuously stored in the memory and after detecting a yarn 1 break, the data is analyzed and the analysis is followed by the retroactive evaluation of the time course of the change ΔP in the position P of the yarn 1 and the time course of the change Δd in the diameter d of the yarn 1 before the detected yarn 1 break, as well as during the yarn 1 break itself, whereupon the results of this evaluation are compared to the preset time courses of the change ΔP in the position P of the yarn 1 and the change Δd in the diameter d of the yarn 1 to determine "the type" of yarn 1 break, e.g. whether it is a technological break or a break caused, for example, by a sliver impurity, or whether it is a break caused by the break of the sliver or the sliver end, etc. The determination of "the type" of the yarn 1 break is suitable, e.g., for setting specific commands to stop the respective spinning station and/or for determining the subsequent behavior of the machine, of the working means and/or of the human operator of the machine at a given workstation so as to eliminate the defective condition or to eliminate the causes of the yarn break.

Modifications and variations can be made to the embodiments illustrated or described herein without departing from the scope and spirit of the invention as set forth in the appended claims.

The invention claimed is:

1. A method of contactless optical detection of yarn at a workstation of a yarn manufacturing textile machine in which the yarn moves in a sensing slot between a source of radiation and an optical sensor having at least one row of radiation sensitive elements arranged next to each other, whereby shading of the individual radiation sensitive elements by yarn moving through the sensing slot is monitored and a state of the yarn is evaluated on a basis of the monitoring, the method further comprising:
monitoring and evaluating a position of the yarn in the sensing slot or a time course of the position of the yarn in the sensing slot;
detecting a change in the position or in the time course of the position of yarn in the sensing slot corresponding to a yarn break before an end of the yarn break passes through the sensing slot; and
generating a stop signal for the workstation.

2. The method according to claim 1, wherein a detected change in the position or in the time course of the position of the yarn in the sensing slot is compared to a pre-set limit value, wherein the stop signal is generated when the pre-set limit value is exceeded.

3. The method according to claim 2, wherein a change in diameter of the yarn in the sensing slot is monitored and mutually evaluated with the change in the position or the time course of the position of the yarn in the sensing slot to eliminate effects of changes in the diameter on detecting the yarn break.

4. The method according to claim 3, wherein data from the monitoring and evaluating of the position or the time course of the position of the yarn in the sensing slot and data from the monitoring and evaluating changes in the diameter of the yarn is continuously stored and, after the detection of the yarn break, the data is retrospectively evaluated and results of the retrospective evaluation are compared to and used to adjust the pre-set limit values.

5. The method according to claim 4, wherein based on the retrospective evaluation, a type of the yarn break is determined, the method comprising one or more of:

generating specific commands to stop a spinning station of the textile machine;

generating commands for subsequent behaviour of a service robot; and setting subsequent behaviour of a human operator of the textile machine.

6. An optical sensor for detecting a yarn at a workstation of a textile machine, comprising:

a sensing slot;

a radiation source disposed to transmit sensing radiation across the sensing slot;

an optical sensor disposed at a distance opposite the radiation source, the optical sensor comprising at least one row of radiation sensitive elements arranged next to each other;

a monitoring and evaluation device configured to monitor and evaluate a state of the yarn in the sensing slot including a position of the yarn and a diameter of the yarn;

the monitoring and evaluation device connected to a device for stopping the workstation upon detection a yarn break by the monitoring and evaluation device; and the monitoring and evaluation device further configured to detect a change in the position of the yarn or in the a time course of the position of the yarn corresponding to a yarn break before an end of the yarn break passes through the sensing slot.

7. The optical sensor according to claim 6, wherein the monitoring and evaluation device is coupled to a memory element in which a pre-set limit of the changes in the position of the yarn or in the time course of the position of the yarn are stored, wherein the yarn monitoring and evaluation device is further configured to compare the changes in the position of the yarn or in the time course of the position of the yarn to the pre-set limit values.

8. The optical sensor according to claim 7, wherein the monitoring and evaluation device is further configured to mutually process signals indicating changes in the diameter of the yarn and changes in position of the yarn or in the time course of the position of the yarn.

9. The optical sensor according to claim 6, wherein the optical sensor also is a yarn quality sensor.

10. A yarn manufacturing textile machine, comprising:

at least one row of workstations, each workstation comprising:

a fiber feeding device that supplies fibers to a spinning unit;

a yarn draw-off mechanism downstream of the spinning unit;

a yarn winding device downstream of the yarn draw-off device; and the one optical yarn sensor according to claim 6.

11. The textile machine according to claim 10, wherein the optical sensor comprises a yarn quality sensor between an outlet of the spinning unit the yarn draw-off mechanism.

* * * * *